UNITED STATES PATENT OFFICE.

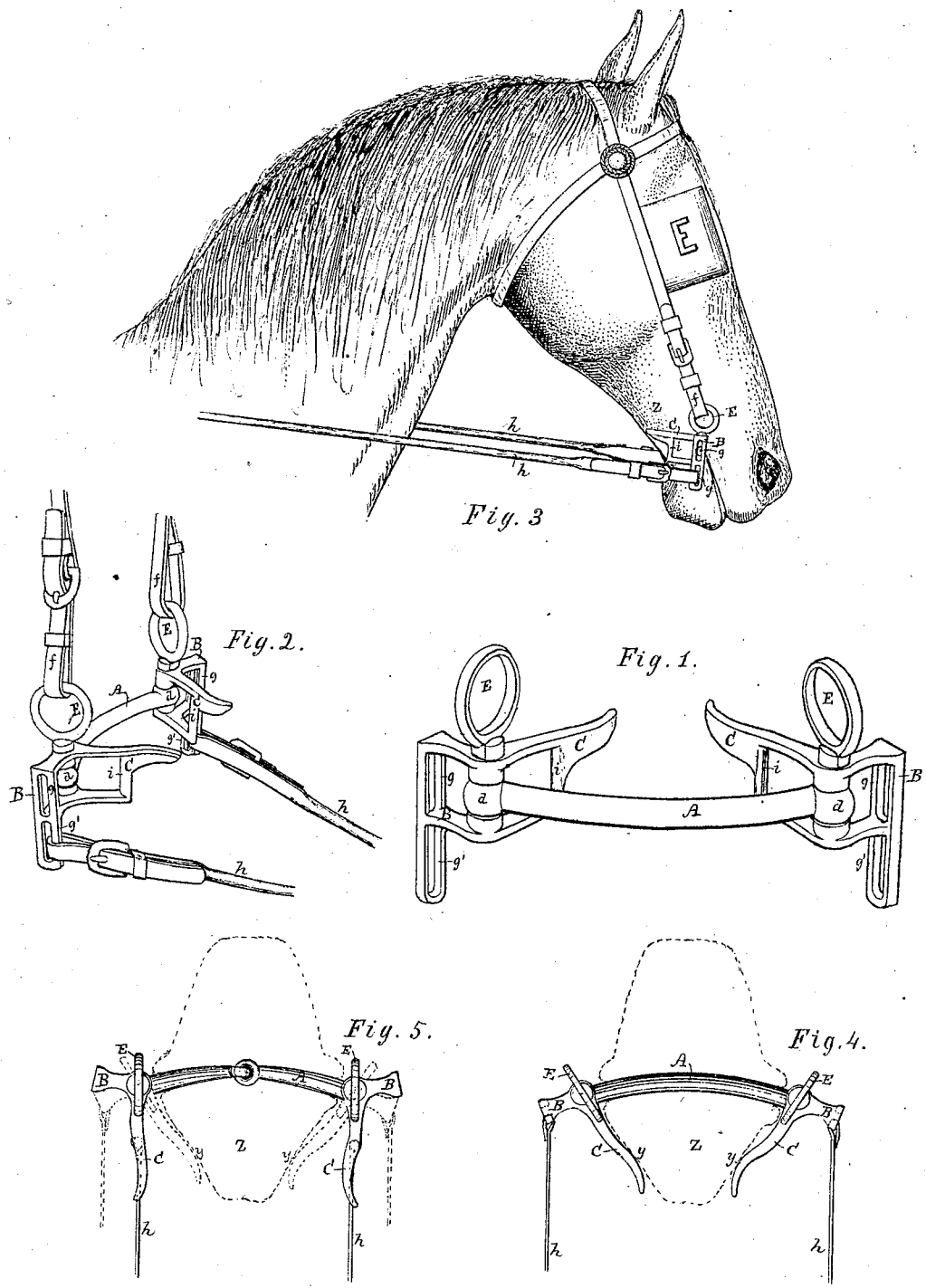

GEORGE W. EDDY, OF WATERFORD, NEW YORK.

IMPROVEMENT IN BRIDLE-BITS.

Specification forming part of Letters Patent No. 132,149, dated October 15, 1872.

*To all whom it may concern:*

Be it known that I, GEORGE W. EDDY, of Waterford, in the county of Saratoga and State of New York, have invented certain new and useful Improvements in Bridle-Bits, of which the following is a specification, reference being had to the accompanying drawing.

My invention relates to the class of bridle-bits in which a pair of arms on the ends of the mouth-piece are pressed inward against the outer sides of the lower jaw of a horse when the reins are drawn taut. In the bits heretofore made of that class the arms have been rigidly connected to the outer ends of the mouth-piece, which was in two parts, jointed or hinged together in the middle, so that the the arms could be pressed against the sides of the lower jaw only by bending the hinge or joint in the middle of the mouth-piece; and the jointed mouth-piece is generally more uncomfortable to the mouth of a horse, and is more liable to injure it, than a rigid mouth-piece.

The first part of my invention avoids all necessity for having a jointed mouth-piece, and consists of a pair of elbow-levers hinged or pivoted to the outer ends of the mouth-piece, and constructed and arranged essentially as hereinafter set forth, so that by pulling on reins attached to the laterally-projecting arms of said elbow-levers the rear arms of the levers will be pressed inward against the outer sides of the lower jaw of a horse, whether the mouth-piece is rigid, flexible, or jointed, and at the same time the laterally-projecting arms of the levers will serve to increase the leverage or guiding power of the bit. Another part consists of downward extensions of the lateral arms of the elbow-levers when they are hinged or pivoted to the outer ends of the mouth-piece, substantially as hereinafter described, so that by pulling on the reins when they are attached to the said downward extensions of the lateral arms the rear arms of the levers will be simultaneously pressed inward against and upward along the outer sides of the lower jaw to give greater control over a very hard-bitted horse. Another part consists of loops, or their equivalents, formed and arranged on both arms of the two elbow-levers that are hinged or pivoted to the outer ends of the mouth-piece, substantially as hereinafter described, so that the reins can be attached to either the rear or the lateral arms of the levers, and so that the rear arms shall or shall not be pressed against the lower jaw of a horse by pulling on the reins, according as the reins shall be attached to the lateral arms or to the rear ones, whereby the bit is rendered suitable for driving horses having very tender mouths, as well as those that are hard-bitted. Another part consists in the combination with the elbow-levers, hinged or pivoted to the outer ends of the mouth-piece, of a pair of loops or rings arranged directly above the hinges or pivots of the elbow-levers, substantially as hereinafter set forth, whereby the bit is suspended and held by the head-stall, with the rear arms of the levers in the proper positions to gripe the lower jaw of a horse, whether the reins are taut or slack.

In the drawing, Figure 1 is a perspective view of one of my improved bridle-bits; Fig. 2 is a perspective view of the same with the ends of the reins and head-stall attached; Fig. 3 is a representation of a head of a horse having a bridle thereon, with one of my improved bits applied thereto; and Figs. 4 and 5 are plans of two of my improved bridle-bits, with the reins attached to different part of the levers.

B C B C are elbow-levers that are hinged or pivoted to the outer ends $d\,d$ of the mouth-piece A, so as to turn or vibrate to and fro thereon in planes parallel, or approximately so, to the length of the mouth-piece. When the reins $h\,h$ are attached to the loops $g\,g$ of the lateral arms B B, by then pulling on the reins the rear arms C C will be pressed firmly against, so as to gripe the sides of the lower jaw Z of a horse, somewhat as indicated at $y\,y$ in Fig. 4, and at the same time the mouth-piece A will be drawn and pressed against the inner side of that jaw, and the arms B B will extend laterally beyond the ends of the mouth-piece, as indicated in Fig. 4, and thus increase the leverage or guiding power of the bit, so that a hard-pulling, vicious, or frightened horse can generally be thereby easily managed and controlled. To give greater control over a very hard-bitted, frightened, or vicious horse I attach the reins $h\,h$ to the downward extensions $g'\,g'$ of the lateral arms, as shown in Figs. 2 and 3, so as to give a powerful upward rubbing action to the rear arms c c against the lower jaw of the horse, while they are griped against the sides of that jaw by pulling on the reins attached to the downward extensions g' g' of the lateral arms. To render the bit suitable for driving very gentle horses with tender mouths I form the rear arms C C of the elbow-levers with loops i i for the attachment of the reins thereto, as indicated at h h in Fig. 5, so that by then pulling on the reins the rear arms C C will be drawn directly rearward, and will not be pressed against the outer sides of the lower jaw of a horse. The loops or rings E E are arranged directly over and project rigidly above the pivots or hinges by which the elbow-levers B C B C are secured to the outer ends of the mouth-piece, so that when the lower ends t t of a head-stall are attached to the loops E E, and the head-stall and bit are applied to the head and mouth of a horse, substantially as shown in Fig. 3, the bit is then constantly held with the rear arms C C of the levers in the proper positions to gripe the lower jaw of a horse, whether the reins are slack or taut, and in whatever direction or position the head of the horse is turned or held. The mouth-piece A may be flexible throughout its whole length, or it may be jointed in the middle, as shown in Fig. 5; but I generally prefer to have the mouth-piece consist of one rigid piece, as shown in Figs. 1, 2, and 4. The elbow-levers B C B C may be hinged, pivoted, or jointed to the mouth-piece A by means of any suitable devices. In the bit shown in Figs. 1 and 2 the elbow-levers are hinged or pivoted to the mouth-piece by drilling holes through them all, and inserting therein pins formed on the loops E E, and then riveting the lower ends of those pins with the loops or rings E E fast to the elbow-levers.

What I claim as my invention, and desire to secure by Letters Patent, is—

1. A bridle-bit having a pair of elbow-levers hinged or pivoted to the outer ends of a rigid, flexible, or jointed mouth-piece, with laterally-projecting arms B B for the attachment of the reins and rearwardly-extended arms C C for griping the outer sides of the lower jaw of a horse, substantially as herein set forth.

2. In a bridle-bit having a pair of elbow-levers arranged and hinged or pivoted on the outer ends of the mouth-piece, as described, the downward extensions g' g' of the lateral arms of the said elbow-levers, as set forth.

3. In a bridle-bit having a pair of elbow-levers hinged or pivoted to the outer ends of the mouth-piece, as described, the rein-loops i i and g g or g' g' in the rear arms C C, and lateral arms B B of the elbow-levers, as set forth.

4. The combination of the mouth-piece A, the elbow-levers B C B C, hinged or pivoted to the outer ends of the mouth-piece, and the head-stall rings or loops E E, arranged and extended rigidly above the hinges or pivots of the said elbow-levers, substantially as described.

GEO. W. EDDY.

Witnesses:
 H. A. MERRITT,
 SOLOMON P. SMITH.